United States Patent [19]

Kaneko et al.

[11] 4,111,889

[45] Sep. 5, 1978

[54] PLASTICIZED HALOGEN CONTAINING RIGID RESIN COMPOSITION

[75] Inventors: Akira Kaneko; Ichiroh Ishibashi; Eisyo Nakano, all of Iwaki, Japan

[73] Assignee: Kureha Kagaku Kogyo Kabushiki Kaisha, Tokyo, Japan

[21] Appl. No.: 687,766

[22] Filed: May 19, 1976

[30] Foreign Application Priority Data

May 20, 1975 [JP] Japan .................. 50-59209

[51] Int. Cl.² ............... C08K 5/12; C08K 5/13
[52] U.S. Cl. .................. 260/31.8 M; 260/31.8 J; 260/31.8 R
[58] Field of Search .......... 260/31.8 J, 31.8 R, 260/31.8 M, 884, 876

[56] References Cited

U.S. PATENT DOCUMENTS

| | | | |
|---|---|---|---|
| 2,872,366 | 2/1959 | Kiernan et al. ............ | 154/129 |
| 3,338,852 | 8/1967 | Reventas et al. ........... | 260/17.4 |
| 3,354,109 | 11/1967 | Evans et al. .............. | 260/31.8 |
| 3,644,246 | 2/1972 | Lozanou .................. | 260/23 XA |
| 3,780,134 | 12/1973 | Lonning .................. | 260/876 |

*Primary Examiner*—Stanford M. Levin
*Attorney, Agent, or Firm*—Flynn & Frishauf

[57] ABSTRACT

A halogen containing rigid resin composition contains 100 parts by weight of a halogen containing resin and 0.1 to 2.0 parts by weight of a dibasic acid-higher alcohol ester represented by a general formula

ROOC(X)COOR' where X denotes a divalent saturated hydrocarbon group of $C_2$ to $C_8$; R, a monovalent saturated hydrocarbon of $C_{11}$ to $C_{32}$; and R', a monovalent saturated hydrocarbon group of $C_{11}$ to $C_{32}$.

5 Claims, No Drawings

PLASTICIZED HALOGEN CONTAINING RIGID RESIN COMPOSITION

This invention relates to a halogen containing rigid resin composition excellent in processability.

A halogen containing rigid resin composition such as polyvinyl chloride or its copolymer or a mixed polymer with polyvinyl chloride is expected to find an increasing demand as an indispensable material for a water supply pipe, sewage pipe, industrial plate, package material, etc. The halogen containing resin is liable to be decomposed during a processing operation due to the processing temperature being near the decomposition temperature and for this reason a stabilizer is added during the processing operation to the resin so as to maintain good heat stability. Further addition of such a heat stabilizer to the halogen containing resin contributes less to the processability of the resin and in general various other additives are added to the resin. The addition of such known additives contributes to a certain extent to the processability of the resin due to, for example, the suppression of a heat generation resulting from the self-friction of the resin and the resin-to-metal friction. These known additives are effective for the improvement of the processability, but they usually are poor in their compatibility with the resin. The additives include higher fatty acids, higher alcohols, low molecular weight polyethylene, etc. As the result, the additives provide a good processability to the resin, but they prevent the homogeneous fusion of the resin due to their low compatibility to the resin, lowering the physical properties of an article and leading to an unseemly outer appearance due to its exuding to the outer surface of the article. In an attempt to avoid such drawbacks a lesser amount of additives has to be added to the resin. Consequently, these means lead to lowered processability (productivity).

It is accordingly the object of this invention to provide a halogen-containing rigid resin composition, excellent in processability, without substantially impairing its physical properties.

According to this invention there is provided a halogen containing rigid resin composition comprising 100 parts by weight of a halogen containing resin, an effective amount of heat stabilizer and 0.1 to 2.0 parts by weight of dibasic acid higher alcohol ester represented by a general formula; ROOC(X)COOR'

Where X denotes a divalent saturated or unsaturated hydrocarbon group of $C_2$ to $C_8$; R, a monovalent saturated hydrocarbon group of $C_{11}$ to $C_{32}$ and R', a monovalent saturated hydrocarbon group of $C_{11}$ to $C_{32}$.

A halogen containing rigid resin according to this invention includes polyvinyl chloride; a copolymer containing more than 75% by weight of vinyl chloride and less than 25% by weight of the other monomer component, copolymerizable with the vinyl chloride monomer, such as vinyl acetate, vinylidene chloride, ethylene, propylene, acrylic ester, methacrylic ester, acrylonitrile, higher alkyl vinyl ether etc.; after-chlorinated polyvinyl chloride; a mixture of polyvinyl chloride with a polymer or copolymer of vinyl acetate, ethylene, propylene, butadiene, acrylic ester, acrylonitrile, methacrylic ester, etc. or one obtained by graft polymerization of vinyl chloride with respect to a copolymer and including more than 70 parts by weight of polyvinyl chloride. A butadiene containing impact resistant reinforcing agent, acrylic impact modifier, or chlorinated polyethylene may be further added as required. In this sense, the term "halogen containing hard resin" means a known halogen containing hard resin containing no plasticizer or a small percentage of known plasticizer.

This invention is, of course, advantageously applicable to the case where a resin component is a halogen containing resin only. For a resin component containing a mixture of a halogen containing resin and another resin as an impact-resistant reinforcing agent (impact resistant modifier resin), the workability and impact resistance are further enhanced through a dibasic acid-higher alcohol ester blending. Examples of such an impact-resistant reinforcing agent are butadiene polymer rubber; a copolymer rubber consisting principally of butadiene and including a monomer copolymerizable with the butadiene, such as butadiene-styrene copolymer rubber and butadiene-acrylonitrile copolymer rubber; a rubber-plastics graft copolymer including one or more vinyl or vinylidene monomers as a graft component with a butadiene polymer or butadiene-dominant copolymer as a trunk polymer, such as butadiene-styrene graft resin (BS resin), butadiene-styrene-methylmethacrylate-acrylonitrile graft copolymer (MBAS resin), butadiene-styrene-methylmethacrylate-vinyl chloride graft copolymer etc.; a copolymer rubber consisting mainly of alkylacrylate (alkyl group having 2 to 12 carbon atoms) and including a lesser amount of monomer selected from a group consisting of a conjugated diene monomer, vinyl monomer and vinylidene monomer copolymerizable with the alkylacrylate; alkylacrylate graft copolymer obtained by graft-polymerization of vinyl or vinylidene monomer to an alkylacrylate polymer or a copolymer as a trunk polymer, such as an alkylacrylate-methylmethacrylate-styrene graft copolymer and alkylacrylate-butadiene-methyl-methacrylate-styrene graft copolymer; a chlorinated polyethylene; an ethylene vinyl acetate copolymer. They are generally known as impact-resistant modifiers for a halogen containing resin.

A dibasic acid-higher alcohol ester used as an additive in this invention is represented by a general formula ROOC(X)COOR' in which X denotes a divalent chain- or cyclic-type saturated or unsaturated hydrocarbon group of $C_2$ to $C_8$, R denotes a monovalent chain-or cyclic-type saturated hydrocarbon group of $C_{11}$ to $C_{32}$, preferably $C_{12}$ to $C_{24}$, and R' denotes a monovalent chain-or cyclic type saturated hydrocarbon group of $C_{11}$ to $C_{32}$, preferably $C_{12}$ to $C_{24}$. An example of the dibasic acid-higher alcohol ester is di-ester obtained by an esterification reaction of (a) a dibasic acid such as succinic acid, glutaric acid, adipic acid, suberic acid, azelaic acid, sebacic acid,
(b) a monohydric alcohol with a hydrocarbon group having a carbon atoms of 11 to 32, such as lauryl alcohol, myristyl alcohol, cetyl alcohol, stearyl alcohol, arachidyl alcohol (eicosyl alcohol), behenyl alcohol, carnaubyl alcohol, ceryl alcohol, corianyl alcohol, myricyl alcohol, lacceryl alcohol, oleyl alcohol, etc. From 0.1 to 2.0 parts by weight of the dibasic acid-higher alcohol ester are added to 100 parts by weight of the halogen containing resin. When the dibasic acid-higher alcohol ester is used in an amount of less than 0.1 part by weight, the processability of the resin is not satisfactorily attained and, with more than 2.0 parts by weight, there is a fear that the transparency, appearance and physical properties of the articles produced from the composition will be impaired.

Compounds of the above-mentioned formula in which R and R' have 1 to 8 carbon atoms are known as plasticizers, such as dibutylphthalate (DBP), dioctyladipate (DOA), dibutylsebacate (DBS), etc. But these compounds having more than 11 carbon atoms are said to serve as poor plasticizers as well as exuding to the surface of the resin. For this reason, these compounds have not been used in practice.

This invention is based on the discovery that the addition to a halogen containing resin of 0.1 to 2.0 parts by weight of a dibasic acid-higher alcohol ester having the above-mentioned carbon atom range improves the processability of the resin, contrary to conventional concepts, without substantially impairing the properties of an article.

A heat stabilizer used in this invention includes an organic tin series stabilizer, lead compound series stabilizer, cadmium-barium stabilizer, calcium-zinc stabilizer, epoxized vegetable oil, etc. By way of example are listed an inorganic lead salt such as tribasic lead sulfate, dibasic lead sulfate, dibasic lead phosphite, lead silicate, etc.; a salt of a fatty acid, such as dibasic lead stearate, a lead salt of a fatty acid, a metallic salt such as cadmium, barium, calcium, zinc, magnesium salt, etc., of an organic phosphate or an organic tin fatty acid; an organic tin alkylmercapto compound; organic tin maleic acid salt; maleic acid ester salt and so on. Also listed is, for example, an epoxized vegetable oil having a synergistic effect with these materials. These heat stabilizers can be used singly or in combination. As additives are listed polyhydric alcohols; a phenol- and organic phosphorous acid-series antioxidant and sulfur-containing antioxidant; a higher fatty acid represented by stearic acid, palmitic acid, etc.; a lubricant such as a fatty acid ester represented by a low molecular weight polyethylene, stearic acid butyl ester, etc.; an ultraviolet ray absorbant; a filler such as calcium carbonate, silicic acid, etc.; and a pigment. These additives may be jointly used without deviating from the spirit and scope of this invention.

Examples of this invention will now be described below.

EXAMPLE 1

A 75 mm diameter rigid PVC pipe with a blend ratio shown in Table 1 was extruded using a biaxial two-stage extruder with a diameter of 80 mm.

Table 1

|  | Control 1-A | this invention 1-B | Control 1-C | this invention 1-D | this invention 1-E |
|---|---|---|---|---|---|
| PVC(P*1000) | 100 | 100 | 100 | 100 | 100 |
| ABS resin** | 0 | 0 | 10 | 10 | — |
| Acrylic Impact modifier*** | — | — | — | — | 10 |
| Tribasic lead sulfate | 0.5 | 0.5 | 0.5 | 0.5 | 0.5 |
| Bibasic lead stearate | 0.3 | 0.3 | 0.3 | 0.3 | 0.3 |
| Lead stearate | 0.2 | — | 0.2 | 0 | 0 |
| Low molecular weight polyethylene | 0.3 | — | 0.3 | — | — |
| Adipic acid distearyl ester | — | 0.5 | — | 0.5 | 0.5 |
| Titanium white | 0.3 | 0.3 | 0.3 | 0.5 | 0.5 |

*P: degree of polymerization
**ABS resin: Acrylonitrile-butadiene-styrene resin
***Acrylic Impact Modifier: Octylacrylate-butadiene-styrene-methylmethacrylate-acrylonitrile graft copolymer The extruding conditions are as follows;
temperature: cylinder 165° to 190° C (partially)
number of rotations: 25 rpm
die temperature: 185° to 190° C (partially)
The results of extruding are tabulated as follows:

Table 2

|  | Control 1-A | this invention 1-B | Control 1-C | this invention 1-D | this invention 1-E |
|---|---|---|---|---|---|
| extruder motor load (Amp) | 28 | 26 | 34 | 31 | 30 |
| amount extruded (kg/HR) | 86 | 89 | 78 | 83 | 83 |
| resin extruding temperature ° C | 188 | 185 | 198 | 196 | 195 |
| tensile strength (kg/cm$^2$) | 560 | 610 | 510 | 570 | 565 |
| tensile elongation (%) | 110 | 200 | 180 | 210 | 220 |
| Charpy impact strength (kg-cm/cm$^2$) | 5 | 9 | 16 | 82 | 97 |
| penetration temperature (° C) | 83 | 85 | 80 | 83 | 83 |
| outer appearance | good | good | somewhat wavy | good | good |

As shown in Table 2, the articles of this invention show excellent practical workability in strength and elongation.

EXAMPLE 2

A transparent sheet was extruded with a blend ratio shown in Table 3.
extruder: 50 mm diameter uniaxial extruder
screw: L/D = 24
die: 640 mm in width T-die
sheet thickness: 0.2 mm to 0.3 mm

Table 3

|  | Control | this invention | | | | | | | |
|---|---|---|---|---|---|---|---|---|---|
|  | 2-A | 2-B | 2-C | 2-D | 2-E | 2-F | 2-G | 2-H | 2-I |
| PVC(P700) | 100 | 100 | 100 | 100 | 100 | 100 | 100 | 100 | 100 |
| *MBS resin | 3 | 3 | 3 | 3 | 3 | 3 | 3 | 3 | 3 |
| dioctyl tin mercapto compound | 1.5 | 1.5 | 1.5 | 1.5 | 1.5 | 1.5 | 1.5 | 1.5 | 1.5 |
| dioctyl tin maleate polymer | 1.5 | 1.5 | 1.5 | 1.5 | 1.5 | 1.5 | 1.5 | 1.5 | 1.5 |
| dioctyl sebacate | 0.3 | 0.3 | 0.3 | 0.3 | 0.3 | 0.3 | 0.3 | 0.3 | 0.3 |
| glycerine monostearate | 1.0 | | | | | | | | |
| adipic acid distearyl ester | | 1.0 | | | | 0.5 | 1.8 | | 0.2 |
| adipic acid monostearyl ester | | | 1.0 | | | 0.5 | | | |
| sebacic acid dilauryl | | | | 1.0 | | | | 1.5 | |
| maleic acid distearyl | | | | | 1.0 | | | 0.2 | |

*MBS resin: Methylmethacrylate-butadiene-styrene resin

Table 4 shows an amount extruded, temperature variation and appearance (surface) of a resin when the number of screw rotations is increased.

Table 4

|  | the number of rotations | 2-A | 2-B | 2-C | 2-D | 2-E | 2-F | 2-G | 2-H | 2-I |
|---|---|---|---|---|---|---|---|---|---|---|
| amount extruded kg/hr. | 25 | 14 | 17 | 16 | 18 | 16 | 15 | 18 | 18 | 15 |
|  | 35 | 19 | 23 | 21 | 22 | 23 | 20 | 23 | 23 | 20 |
|  | 45 | 23 | 30 | 27 | 28 | 26 | 23 | 30 | 31 | 24 |
| resin temperature (° C) | 25 | 212 | 208 | 208 | 207 | 209 | 208 | 206 | 206 | 210 |
|  | 35 | 220 | 217 | 217 | 216 | 218 | 215 | 213 | 214 | 218 |
|  | 45 | 228 | 221 | 222 | 220 | 225 | 222 | 220 | 220 | 225 |
| appearance (surface) | 25 | good | good | good | good | good | good | good | good | good |
|  | 35 | die-smeared surface somewhat irregular | good | good | good | good | good | good | good | good |
|  | 45 | surface | good | good | good | good | good | good | good | good |

As will be evident from Table 4, samples 2-B to 2-I were excellent over sample 2-A in respect of the amount extruded, resin temperature and appearance.

EXAMPLE 3

A heat-resistant pipe was extruded with a blend ratio shown in Table 5, using an after-chlorinated polyvinyl chloride resin. The test was conducted using calcium and zinc salt in a non-toxic blend procedure.

Table 5

|  | Control | this invention | | |
|---|---|---|---|---|
|  | 3-A | 3-B | 3-C | 3-D |
| after-chlorinated polyvinyl chloride* | 100 | 100 | 100 | 100 |
| MBS series impact-resistant reinforcing agent** | 10 | 10 | 10 | 10 |
| calcium eteanate | 1.0 | 1.0 | 1.0 | 1.0 |
| zinc stearate | 0.5 | 0.5 | 0.5 | 0.5 |
| polyhydric alcohol | 0.4 | 0.4 | 0.4 | 0.4 |
| anti-oxidant | 0.5 | 0.5 | 0.5 | 0.5 |
| low molecular weight polyethylene | 1.0 | 1.0 | 1.0 | 1.0 |
| stearic acid ester | 1.0 | — | — | — |
| adipic acid distearyl ester | — | 1.0 | — | — |
| sebacic acid distearyl ester | — | — | 1.0 | — |
| phthalic acid dilauryl ester | — | — | — | 1.0 |

*Chlorinated polyvinyl chloride: chlorine content 65%
**methylmethacrylate-butadiene-styrene resin A pipe of one inch diameter was extruded by a 90 mm diameter uniaxial extruder using a compound dry-blended for 5 minutes at 90° C by Henschel mixer. Extruding condition:
90 mm dia. uniaxial extruder
L/D = 18
screw compression ratio 8.0
the number of rotation 11 rev./min.
Temperature condition:
cylinder: 105° to 195° C (partially)
die: 170° to 190° C (partially)
The result of extruding is shown in Table 6.

Table 6

|  | Control | this condition | | |
|---|---|---|---|---|
|  | 3-A | 3-B | 3-C | 3-D |
| extruding operability | difficulty was encountered during the extrusion due to insufficient | good | good | good |
|  |  | no decomposition product was produced | | |

Table 6-continued

| | Control | this condition | | |
|---|---|---|---|---|
| | 3-A | 3-B | 3-C | 3-D |
| pipe appearance | gelation, partially yielding decomposition products | good at inside surface but somewhat coarse at outside surface | good at inside and outside surface | |
| Vicat indentation temperature (° C) | | 110° C | 112° C | 111° C |
| Charpy impact strength (kg-cm/cm²) | | 35 | 38 | 34 |

EXAMPLE 4

A 8 mm rigid PVC industrial plate with a blend ratio shown in Table 7 was extrusion molded using a 90 mm diameter uniaxial extruder.

Table 7

| | Control | this invention | |
|---|---|---|---|
| | 4-A | 4-B | 4-C |
| PVC(P1000) | 100 | 100 | 100 |
| tribasic lead sulfate | 2.0 | 2.0 | 2.0 |
| bibasic lead stearate | 1.0 | 1.0 | 1.0 |
| lead stearate | 0.5 | 0.5 | 0.5 |
| calcium stearate | 0.5 | 0.5 | 0.5 |
| stearic acid | 0.3 | 0.3 | 0.3 |
| dioctyladipate (DOA) | — | 1.0 | — |
| dieicosyladipate | — | — | 1.0 |
| low molecular weight polyethylene | 1.0 | — | — |
| TiO₂ | 0.3 | 0.3 | 0.3 |
| Carbon black | 0.01 | 0.01 | 0.01 |

Extrusion condition:
cylinder: 170° to 190° C (partially)
die: 190° to 195° C (partially)
the number of screw rotations: 22 RPM
The result of extruding is shown in Table 8.

Table 8

| | | Control | | this invention |
|---|---|---|---|---|
| | | 4-A | 4-B | 4-C |
| amount extruded resin | kg/hr | 31 | 28 | 33 |
| temperature | ° C | 193 | 198 | 195 |
| impact strength V-notch | Charpy method kg.cm/cm² | 4.5 | 4.0 | 7.0 |
| tensile strength | kg/cm² | 520 | 540 | 535 |
| tensile elongation | % | 160 | 115 | 220 |
| softening temperature | Clash-Berg method ° C | 70 | 68 | 72 |
| Vicat softening point (ASTM.D-1525) | ° C | 90 | 86 | 92 |

As shown in Table 8, sample 4-C using the additive according to this invention is excellent, in productivity, heat resistance, impact strength, elongation, etc., over samples 4-A and 4-B using known additive.

What we claim is:

1. A halogen containing rigid resin composition containing 100 parts by weight of a halogen containing resin, an effective amount of heat stabilizer and 0.1 to 2.0 parts by weight of a dibasic acid-higher alcohol ester represented by a general formula:

ROOC(X)COOR' where
X denotes a divalent saturated hydrocarbon group of $C_2$ to $C_8$, R denotes a monovalent saturated hydrocarbon group of $C_{12}$ to $C_{32}$ R' denotes a monovalent saturated hydrocarbon group of $C_{12}$ to $C_{32}$.

2. A halogen containing rigid resin composition according to claim 1 in which said halogen containing resin is selected from the group consisting of polyvinyl chloride and chlorinated polyvinyl chloride.

3. A halogen containing rigid resin composition according to claim 2, further including at least one impact resistant modifier resin.

4. A halogen containing rigid resin composition according to claim 3, in which the impact resistant modifier resin is at least one graft polymer comprising a trunk polymeric portion selected from the group consisting of butadiene rubber and butadiene copolymer rubber and a side chain thereof selected from the group consisting of styrene, methylmethacrylate, acrylonitrile and vinylchloride.

5. A halogen containing rigid resin composition according to claim 1, in which said dibasic-higher alcohol ester is at least one selected from the group consisting of distearyl adipate, dilauryl sebacate, distearyl adipate, distearyl sebacate, and dieicosyl adipate.

* * * * *

UNITED STATES PATENT AND TRADEMARK OFFICE
CERTIFICATE OF CORRECTION

PATENT NO. : 4,111,889
DATED : September 5, 1978
INVENTOR(S) : AKIRA KANEKO et al It is certified that error appears in the above-identified patent and that said Letters Patent are hereby corrected as shown below:

Column 1, line 37: rewrite "lead" as ---leads---.

Column 1, line 49: rewrite "Where" as ---where---.

Columns 3-4, Table 1, first column: replace "PVC(P* 1000)" with ---PVC($\overline{P}$* 1000)---.

Columns 5-6, Table 3, first column: replace "PVC(P700)" with ---(PVC($\overline{P}$700)---.

Columns 7-8, Table 7, first column: replace "PVC(P1000)" with ---PVC($\overline{P}$1000)---.

Column 8, line 31 (Claim 1): replace "$C_{32}R'$" with ---$C_{32}$ and R'---.

*Signed and Sealed this*

*Twentieth* Day of *November 1979*

[SEAL]

Attest:

RUTH C. MASON
*Attesting Officer*

LUTRELLE F. PARKER
*Acting Commissioner of Patents and Trademarks*